(12) United States Patent
Hasegawa

(10) Patent No.: US 11,586,723 B2
(45) Date of Patent: Feb. 21, 2023

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Kiwamu Hasegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 16/822,410

(22) Filed: Mar. 18, 2020

(65) Prior Publication Data

US 2020/0311253 A1    Oct. 1, 2020

(30) Foreign Application Priority Data

Mar. 27, 2019    (JP) .............................. JP2019-061358

(51) Int. Cl.
  *G06F 21/51*    (2013.01)
  *G06F 21/52*    (2013.01)

(52) U.S. Cl.
  CPC .............. *G06F 21/51* (2013.01); *G06F 21/52* (2013.01); *G06F 2221/2139* (2013.01)

(58) Field of Classification Search
  CPC ....................................................... G06F 21/51
  See application file for complete search history.

(56) References Cited

U.S. PATENT DOCUMENTS

| | | | | |
|---|---|---|---|---|
| 5,740,248 A | * | 4/1998 | Fieres ..................... | G06F 21/51 713/150 |
| 5,956,507 A | * | 9/1999 | Shearer, Jr. ............... | G06F 9/52 718/100 |
| 8,205,094 B2 | * | 6/2012 | Dive-Reclus ......... | H04L 63/123 713/187 |
| 2006/0015723 A1 | * | 1/2006 | Lui ....................... | G06F 21/125 713/167 |
| 2006/0053283 A1 | * | 3/2006 | Feinleib ................ | G06F 21/121 713/165 |
| 2006/0095972 A1 | * | 5/2006 | Rogalski ................. | G06F 21/82 726/26 |
| 2006/0101408 A1 | * | 5/2006 | Kotamarthi ......... | G06F 21/6281 717/126 |
| 2007/0027988 A1 | * | 2/2007 | Lavin .................... | H04L 63/102 709/225 |

(Continued)

FOREIGN PATENT DOCUMENTS

JP    2014109821 A    6/2014
JP    2015-084006 A    4/2015

OTHER PUBLICATIONS

Japanese Office Action dated Jan. 5, 2023 in counterpart Japanese Patent Appln. No. 2019-061358.

*Primary Examiner* — Simon P Kanaan
(74) *Attorney, Agent, or Firm* — Venable LLP

(57) ABSTRACT

An information processing apparatus in which a plurality of applications operate is provided. The apparatus comprises a verification unit that verifies whether or not an application can be trusted; and a controller that controls the application, wherein during the execution of a first application executed in response to a user instruction, the controller causes the verification unit to verify a second application that the first application dynamically imports, before the second application is loaded.

9 Claims, 14 Drawing Sheets

(56) References Cited

U.S. PATENT DOCUMENTS

| | | | |
|---|---|---|---|
| 2007/0106981 A1* | 5/2007 | Bird | G06F 8/65 |
| | | | 717/127 |
| 2009/0307029 A1* | 12/2009 | Ramanathan | G06Q 20/0855 |
| | | | 705/67 |
| 2013/0067246 A1* | 3/2013 | Trumbull | G06F 9/4484 |
| | | | 713/193 |
| 2014/0156943 A1 | 6/2014 | Sato | |
| 2014/0185800 A1* | 7/2014 | Fallon | G06F 21/608 |
| | | | 380/55 |
| 2016/0004859 A1* | 1/2016 | Goodes | G06F 21/604 |
| | | | 726/17 |

* cited by examiner

F I G. 4
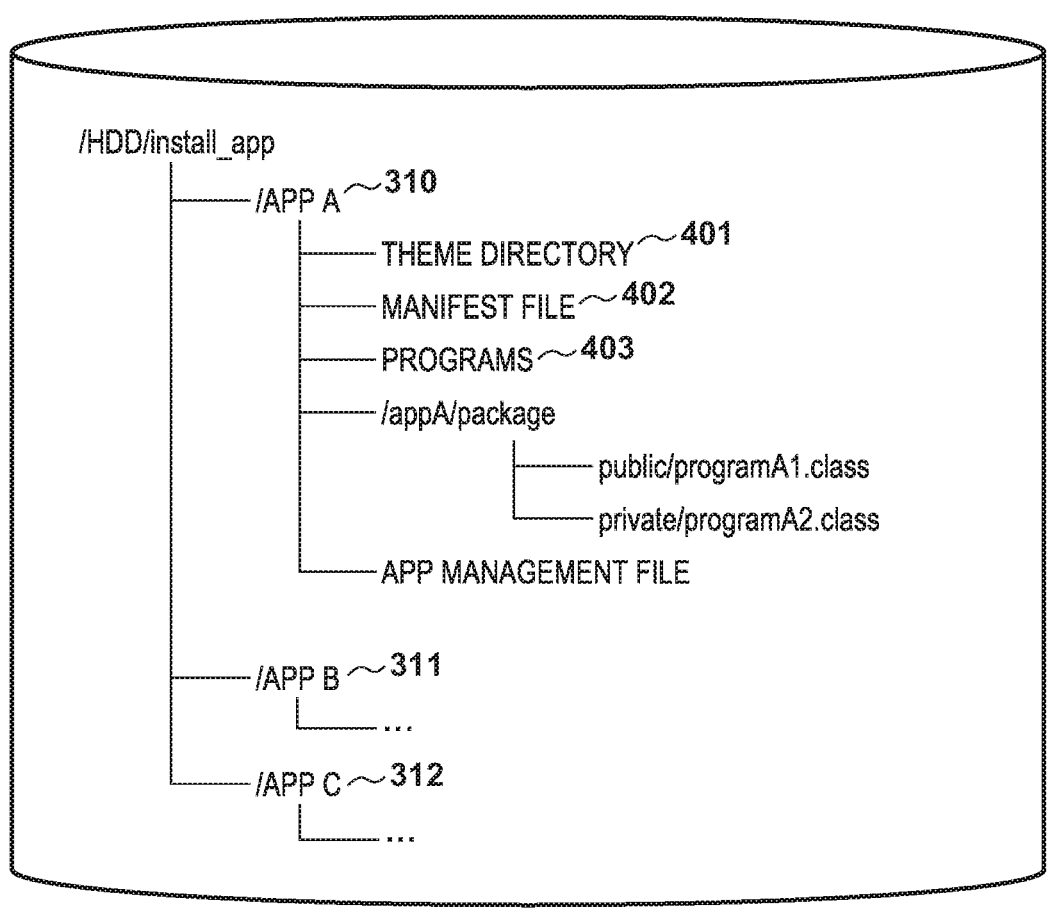

FIG. 5A

MANIFEST FILE OF APP A

```
App-ID: AppA
Export-Package: appA.package.public
Import-Package:
DynamicImport-Package:
etc...
```

FIG. 5B

MANIFEST FILE OF APP B

```
App-ID: AppB
Export-Package:
Import-Package: appA.package.public
DynamicImport-Package:
etc...
```

FIG. 5C

MANIFEST FILE OF APP C

```
App-ID: AppC
Export-Package:
Import-Package:
DynamicImport-Package: appA.package.public
etc...
```

FIG. 6A

PACKAGE LIST — 601

| App-ID | ExportPackage |
|---|---|
| AppA | appA.package.public |

FIG. 6B

PACKAGE LIST OF APP A — 602

603 —
| App-ID | Import-Package |
|---|---|
|  |  |

604 —
| DynamicImport-Package |
|---|
|  |

FIG. 6C

PACKAGE LIST OF APP B — 605

606 —
| App-ID | Import-Package |
|---|---|
| AppA | appA.package.public |

607 —
| DynamicImport-Package |
|---|
|  |

FIG. 6D

PACKAGE LIST OF APP C — 608

609 —
| App-ID | Import-Package |
|---|---|
|  |  |

610 —
| DynamicImport-Package |
|---|
| appA.package.public |

FIG. 6E

PACKAGE LIST OF APP C (AFTER DYNAMICALLY IMPORT) — 611

609 —
| App-ID | Import-Package |
|---|---|
| AppA | appA.package.public |

610 —
| DynamicImport-Package |
|---|
|  |

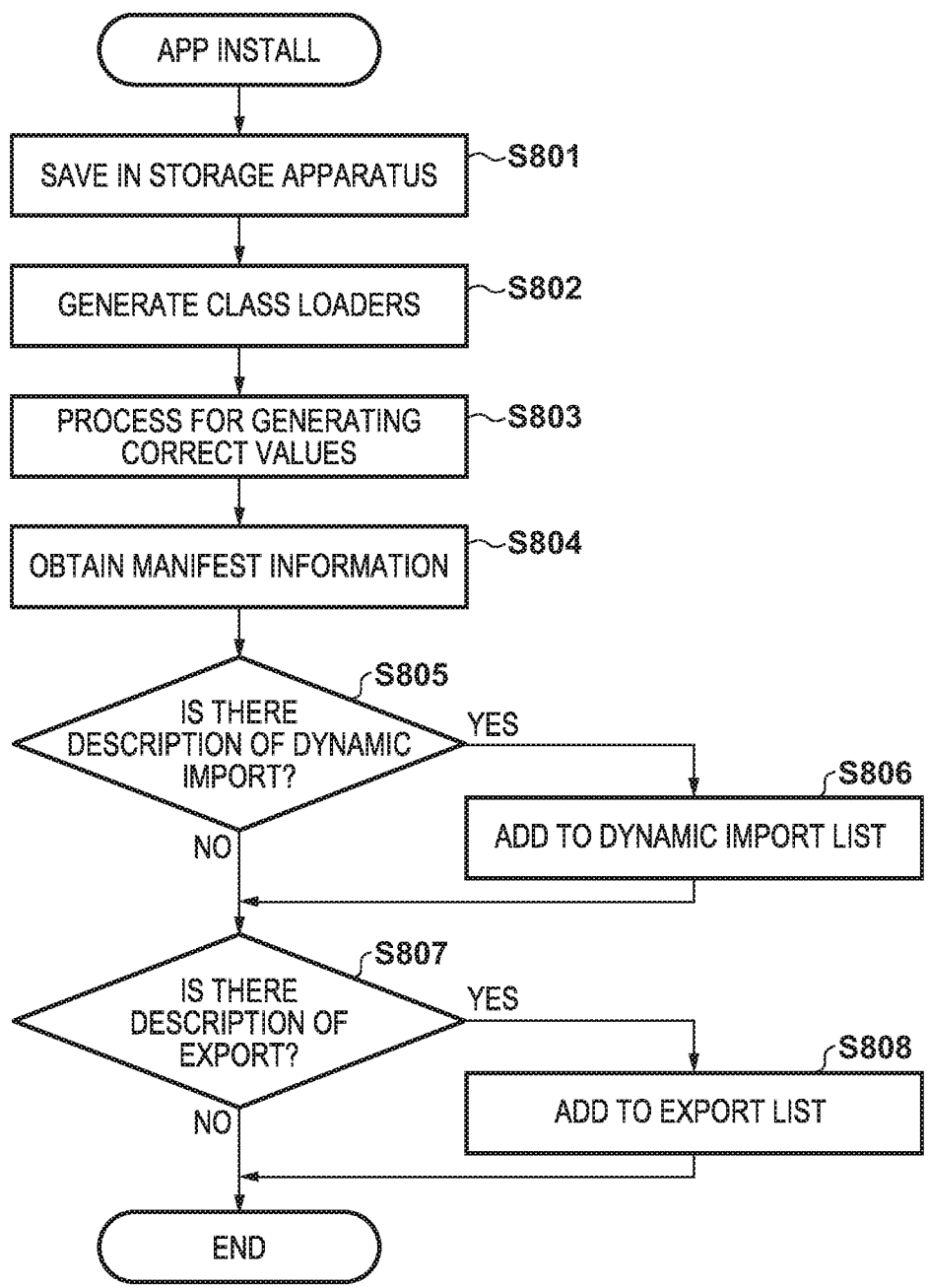

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present invention relates to an information processing apparatus, an information processing method, and a storage medium which ensure the security of a plurality of programs even when the programs are in a dependency relationship, for example.

Description of the Related Art

Generally, when a user attempts to install an application program (to be referred to as "app" hereinafter) in a system or launch the app, the system carries out the launching process after determining whether or not the app can be trusted. If the app cannot be trusted, there is a risk that the entire system will crash or hang, and thus it is possible to stop the launching of that app. For example, there are systems which determine whether information required to execute the app has been tampered with, or has been damaged, and if the app is one in which the information has been tampered with or damaged, the system displays a warning screen and suspends the launching process. App program files, app manifest files containing the information of the app, and so on are examples of the information required to execute the app. A technique that recovers a file when it is detected that the file is damaged can be given as an example of a damage detection function (e.g., Japanese Patent Laid-Open No. 2014-109821).

Furthermore, generally speaking, there are some app execution environments in which the app itself can publicize some of its own program, and another app can then reference and execute the publicized program. Hereinafter, a state where some of a program can be publicized for another app will be called "exporting", and a state where another app can reference the program will be called "importing". At this time, the process for launching the app being exported need not be being executed in the app execution environment.

In an environment in which two apps are installed, with the first app exporting and the second app importing the program of the first app, there is a risk that the second app will execute the program of the first app which cannot be trusted.

For example, assume that an attacker has tampered with the program code of the first app in a state where the first app and the second app have been installed in an embedded device such as an image processing apparatus. In this case, when the system launches the first app, the system verifies the first app and determines that it is an app that cannot be trusted. On the other hand, when the system launches the second app, the system verifies the second app and determines that it is an app that can be trusted. However, the second app can execute part of the program of the first app, and in that case, the program code of the first app is not verified. There is thus the possibility of the program code of the first app, which has been tampered with, being executed, which poses a security risk.

According to Japanese Patent Laid-Open No. 2014-109821, a signature is confirmed when installing an app in an image forming apparatus, and it is therefore not possible to determine whether the app can be trusted after the app has been installed in the image forming apparatus. In other words, it is not possible to handle tampering, damage, and so on after installation.

SUMMARY OF THE INVENTION

The present invention ensures the security of even a plurality of programs which are in a dependency relationship.

The present invention has the following configuration.

According to an aspect of the present invention, an information processing apparatus in which a plurality of applications operate is provided, the apparatus comprising:

a verification unit that verifies whether or not an application can be trusted; and a controller that controls the application, wherein during the execution of a first application executed in response to a user instruction, the controller causes the verification unit to verify a second application that the first application dynamically imports, before the second application is loaded.

According to the present invention, the security of even a plurality of programs which are in a dependency relationship can be ensured.

Further features of the present invention will become apparent from the following description of exemplary embodiments (with reference to the attached drawings).

BRIEF DESCRIPTION OF THE DRAWINGS

FIG. 4 is a diagram schematically illustrating the interior of a storage apparatus.

FIGS. 5A to 5C are diagrams illustrating manifest files of each of apps.

FIGS. 6A to 6E are diagrams illustrating lists in which app management frameworks are managed.

FIG. 8 is a flowchart illustrating processing when an app is installed.

DESCRIPTION OF THE EMBODIMENTS

Figure 1:
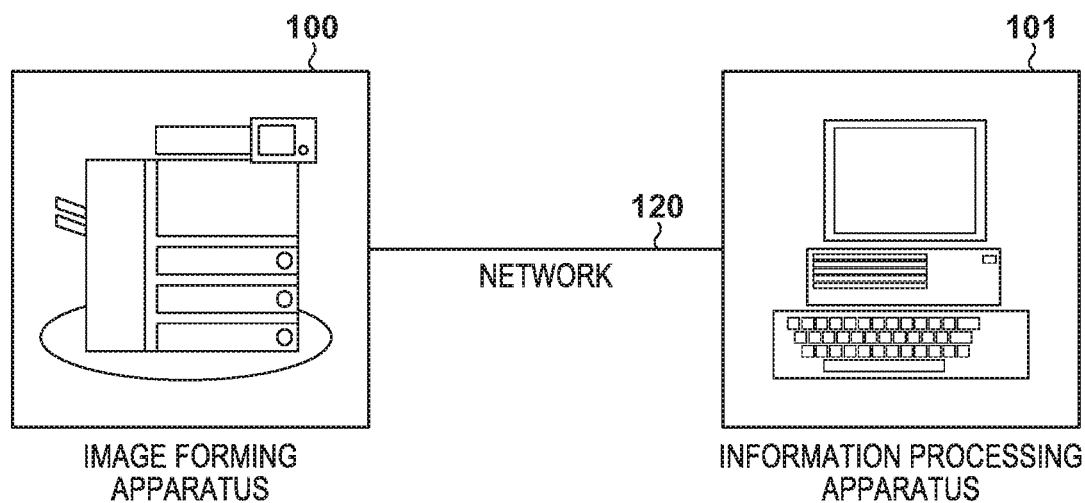
FIG. 1 is an overall schematic diagram.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

System Configuration

FIG. 1 is a diagram illustrating the overall configuration of a system according to the present invention. An image forming apparatus 100 is an example of an information processing apparatus provided with functions according to the present embodiment, and is, for example, a digital multifunction peripheral (MFP) or the like. An information processing apparatus 101 manages the image forming apparatus (100). The information processing apparatus 101 is a generic computer, for example. A network 120 connects the image forming apparatus 100 and the information processing apparatus 101. The information processing apparatus 101 accesses and uses the image forming apparatus 100 over the network (120).

Image Forming Apparatus

Figure 2:
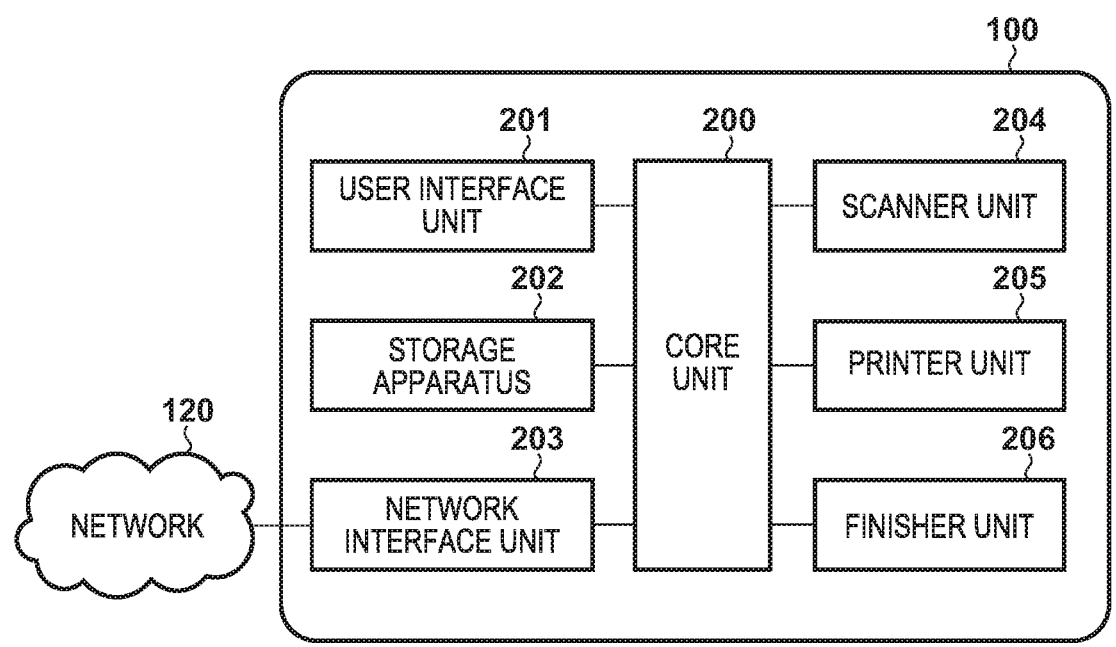
FIG. 2 is a diagram illustrating the hardware configuration of an image forming apparatus.

FIG. 2 schematically illustrates the hardware configuration of the image forming apparatus 100. A core unit 200 is a control unit that controls the image forming apparatus 100 as a whole, as well as the respective units thereof; the core unit 200 includes a processor and memory, for example, and carries out the functions of programs by executing those programs. A user interface unit 201 includes an operating unit and a display unit, and accepts operations by an operator and makes displays for the operator. The user interface unit will be described below using operation screens as examples. A storage apparatus 202 stores program files, data files, and the like. A network interface unit 203 is an interface for connecting to the network 120. A scanner unit 204 optically scans a document image and converts the image into digital data. A printer unit 205 prints and outputs a document image scanned by the scanner unit 204, outputs a print based on a print job input from the information processing apparatus 101, and so on. 206 indicates a finisher unit, which executes post-processing such as stapling, folding, binding, and the like on printed material output from the printer unit 205.

Figure 3:
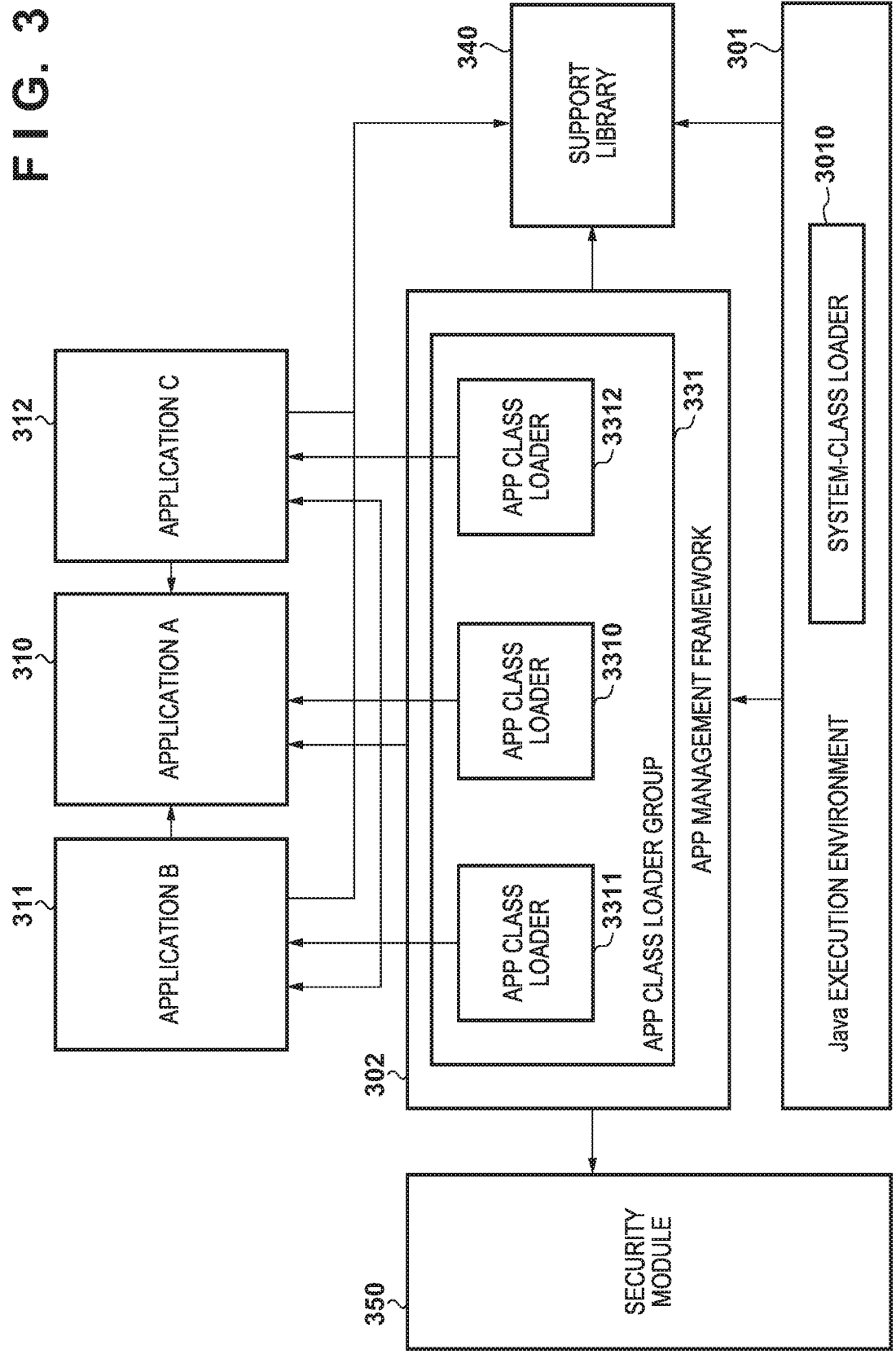
FIG. 3 is a diagram illustrating a system configuration.

FIG. 3 is a diagram illustrating the configuration of a system for executing an application program ("app" hereinafter) in the image forming apparatus 100 according to the present embodiment. The present embodiment assumes that a plurality of apps are run in a Java (registered trademark) execution environment. Here, the apps run in the Java execution environment are written in Java, and the framework for managing the plurality of apps ("app management framework" hereinafter) is also written in Java.

When the user turns the power of the image forming apparatus 100 on, a Java execution environment 301 begins running, and an app management framework 302, which is necessary for enabling the apps to be executed, is launched. The Java execution environment 301 includes a system-class loader 3010 for loading system programs into memory. Generally speaking, programs can be executed in the Java execution environment 301 by loading program files, which are located in the storage apparatus 202, into memory. Class files, in which each program is written in units of classes, are used as the program files. Loading these class files into memory is called "class loading" (or "loading", "program loading"). The app management framework 302 manages the installing, uninstalling, launching, and termination of apps.

An app 310 runs in the image forming apparatus 100, and is an application A (also called "app A" hereinafter) indicating a program which is exported. An app 311 is an app that runs in the image forming apparatus 100, and is an application B (also called "app B" hereinafter) that imports the program exported by the app 310. An app 312 is an app that runs in the image forming apparatus (100), and is an app C indicating a program that dynamically imports the program of the app A 310, when the program of the app A 310 is required, while the app 312 is being executed. Note that an import which is not dynamic may be called a "static import". Dynamically importing the program of another app will be called a "dynamic import" hereinafter. The example described here is one in which the app 311 can import the program exported by the app A 310 and execute that program. Furthermore, the example described here is one in which the app C 312 can dynamically import the program of the app A 310 and execute the program exported by the app A 310. One or more apps can be run in the image forming apparatus 100. Although an example of three apps is given here, an app having multiple conditions, such as exporting and importing, as well as apps that do neither, can also be run in the image forming apparatus 100. An app's lifecycle includes events such as installing, launching, terminating, uninstalling, and updating. A user administrator can manage an app's lifecycle over the network 120 from the information processing apparatus 101.

For example, upon receiving an instruction to install the app A 310 from the user administrator, the app management framework 302 stores the program files of the app A 310 in the storage apparatus 202. In this state, the program files are simply stored in the image forming apparatus 100, and thus the installed app A 310 cannot directly accept user operations. When an instruction to launch the installed app A 310 is then received from the user administrator, the app management framework 302 carries out a process for launching the app A 310. When the launching process is complete, the app A 310 is in a launched state, and an icon of the app A 310 is displayed in an operation screen corresponding to the user interface unit 201. Then, when the icon of the app A 310 displayed in the operation screen is selected by the user administrator, the app A 310 receives a user operation, and the program of the app A 310 is executed in the Java execution environment 301. In this example, the app A 310 receives the user operation and the program of the app A 310 is executed. On the other hand, the app A 310 is exporting the program, and thus another launched app (e.g., the app B 311, the icon of which is displayed in the operation screen) can receive a user operation and execute the program of the app A 310, even in a state where the app A 310 is simply installed.

An app class loader group 331 is a collection of app class loaders for class-loading the programs of the apps. The app class loader group 331 is a part of the programs of the app management framework 302. When an app is stored in the storage apparatus 202, the app management framework 302 generates an app class loader for the installed app. As such, the app class loader and the app are in a one-to-one relationship, and thus which app an app class loader corresponds to can be understood. App class loaders 3310, 3311, and 3312 are app class loaders corresponding to the app A 310, the app B 311, and the app C 312, respectively. A support library 340 is a library for providing a variety of functions of the image forming apparatus 100 to be used by the app.

A security module 350 is a program module that determines whether or not an app can be trusted. The security module 350 verifies that the program files, manifest file, and so on of an app are files that can be trusted, and determines whether or not the app can be trusted. The security module 350 determines that an app cannot be trusted if, for example, some of the program files have been damaged, tampered with, or the like and have been changed as a result. In the present embodiment, a method of comparing file hash values is used as a method for verifying whether or not an app can be trusted. With this method, as preparation, a hash value ("correct value" hereinafter) of a file is calculated and stored at a time when the file can be trusted. Then, when, for example, the file is to be used, the hash value of the same file is calculated again and compared with the correct value which has been stored, in order to check whether or not there are any differences. With this method, it is determined that the app cannot be trusted if the comparison of the hash values indicates that there is a difference between the stored correct value and the recalculated hash value. As such, the security module 350 also generates the correct value in advance.

Note that the Java execution environment 301, the app management framework 302, the support library 340, and the security module 350 are programs included in the system of the image forming apparatus 100. The "programs included in the system" are basic programs installed at the time of manufacture, for managing and controlling the image forming apparatus 100, and constitute an environment for application programs.

When an instruction to install an app is received from a user administrator, the app management framework 302 installs the app in the image forming apparatus 100, and at the same time, requests the security module 350 to generate the correct value (i.e., the hash value to serve as a reference) of the installed app. Upon receiving the request to generate the correct value, the security module 350 calculates hash values for the program files and the manifest file of the app in question, and stores the calculated hash values in the storage apparatus 202 as the correct values. That app can only be executed once the correct value has been associated with the app. When an instruction to launch the app is received from the user administrator, the app management framework 302 requests the security module 350 to verify whether or not the app is an app that can be trusted. Upon receiving the request to confirm (i.e., verify) whether the app can be trusted, the security module 350 calculates hash values for the program files and the manifest file of the app, and compares those hash values with the corresponding correct values stored in advance. If there is no difference between the hash values calculated here and the correct values for both the program files in the manifest file, the security module 350 determines that the app being verified is an app that can be trusted. If, however, there is a difference between either of the values, it is determined that the app cannot be trusted. The app management framework 302 receives the verification result from the security module 350, and continues the process of launching the app if the app for which the launch instruction has been received is an app that can be trusted. If the app cannot be trusted, the process of launching the app is suspended, and a warning indicating that the app cannot be trusted is provided to the user administrator through the information processing apparatus 101. Although a verification method that compares hash values is described as an example here, another method can be used as long as it is a method through which whether an act can be trusted can be verified.

App File Structure

FIG. 4 is an example schematically illustrating each of apps installed in the storage apparatus 202. Upon receiving an instruction to install an app from the user administrator, the app management framework 302 creates a directory in the storage apparatus 202 for the app for which the installation request was received. Here, for example, the app directory is created under the directory path /HDD/inStall_app. A data directory 401 for the app to store data, as well as an app management file used to manage the app, are also created. The app management file is a file for writing information of the app indicating the state of the app, e.g., "installed", "launched", and so on. A manifest file 402 and program files 403 for the app for which the installation instruction has been received are also placed in the app directory. The manifest file 402 and the program files 403 are originally held within the app, and are passed to the app management framework 302 through the information processing apparatus 101 when the instruction to install the app has been received from the user administrator. The app management framework 302 then stores the manifest file 402 and the program files in the storage apparatus 202 as the manifest file 402 and the program files 403, respectively. Java programs are managed with namespaces, and the program files are also distributed according to namespaces. Furthermore, each program file is prepared within the app in a class extension format, with each class extension program file compressed into one or more files having the jar extension. Although the directory structure of the app A 310 is illustrated as an example here, the app B 311 and the app C 312 have the same directory structure. However, the details written in the manifest file and the content of the program differ from app to app.

Manifest File

FIGS. 5A to 5C are examples schematically illustrating the manifest file held within each of the apps. The manifest file 402 in FIG. 5A is the manifest file of the app A 310. The developer of the app A 310 writes, in the manifest file, an "App-ID" through which the app management framework 302 identifies each of the apps The app developer can also write which program of the app is to be exported after "Export-Package:". Likewise, which program of another app is to be imported is written after "Import-Package:", and which program of another app is to be dynamically imported is written after "Dynamic-Import:". In this manner, package importing, exporting, and the like can be declared in the manifest file. Note that a "package" can also be called a collection of class files. The app management framework 302 can determine which program to export, import, or dynamically import for each app by referring to the app manifest file. If the app is not to be exported, imported, or dynamically imported, the app developer leaves the corresponding item blank in the manifest file.

Because the app A 310 is an app to be exported, the name of the program to be publicized is written in "Export-Package:" in the manifest file 402 of the app A. Here, the namespace "appA.package.public" is designated. According to the content of the manifest file 402 of the app A 310, of the programs in the app A 310, the program having the namespace starting with "appA.package.public" is declared as the program to be publicized to other apps. Of the programs of the app A 310 indicated in FIG. 4, programA1.class is to be publicized to the other apps.

A manifest file 404 in FIG. 5B is the manifest file of the app B 311. The program name for another app to be referenced by the app B 311 is written in "Import-Package" in the manifest file 404 of the app B 311. Here, the namespace "appA.package.public" is designated. Thus of the programs exported by other apps, the app B 311 declares the program having the namespace starting with "appA.package.public" as the program to be referred to by other apps. If, when the app B 311 is launched, the program declared by the app B 311 in "Import-Package" is not being exported by any other apps, the app management framework 302 suspends the process for launching the app B 311.

A manifest file 405 in FIG. 5C is the manifest file of the app C 312. The program name for another app to be referenced by the app C 312 is written in "DynamicImport-Package" in the manifest file 405 of the app C 312. Here, the namespace "appA.package.public" is designated. Thus of the programs exported by other apps, the app C 312 declares the program having the namespace starting with "appA-.package.public" as the program to be referenced. Unlike the app B 311, the app C 312 can dynamically import programs from other apps. As such, if, when the app C 312 is launched, the program declared in "DynamicImport-Package" is not being exported by any other apps, the app management framework 302 launches the app B 311. Thus generally speaking, the developer of the app C 312 develops the app C 312 assuming that there are no declared programs from other apps.

Importing, Exporting, and Dynamic Importing

FIGS. 6A to 6E are examples schematically illustrating an export package, an import package, and a dynamic import package stored by the app management framework 302 in memory. The example illustrated here is one in which the information is managed as a list. The list is created by the image forming apparatus 100 according to the procedure illustrated in FIG. 12 (described later).

FIG. 6A illustrates an export package list 601 managed by the app management framework 302. In the export package list 601, an application ID (App-ID) "AppA" and an export package name (Export-Package) "appApackage.public" form a pair, and the app management framework 302 manages the programs exported by the apps.

FIGS. 6B to 6E are package lists 602, 605, 608, and 611, respectively, for each app managed by the app management framework 302. While the export package list 601 manages the information of all apps in a single list, the package lists in FIGS. 6B to 6E manage the package information of corresponding apps in lists. Import packages and dynamic import packages declared by the apps are respectively managed as lists in the package lists. When launching an app, the app management framework 302 obtains the information of the import package or the dynamic import package declared by the app, and stores that information in the package list pertaining to the app being launched. At this time, with respect to an import package, the app management framework 302 specifies an app from the export package list 601, and manages and import package list in accordance with the app being exported. As such, the import package list manages the information of the import package declared by each app as a pair with the app exporting that package ("App-ID").

The package list 602 in FIG. 6B is a package list for the app A 310 managed by the app management framework 302. The package list 602 includes an import package list 603 and a dynamic import package list 604 pertaining to the app A 310. As illustrated in FIGS. 5A to 5C, the app A 310 declares neither an import package nor a dynamic import package, and thus the package lists 603 and 604 are empty.

The package list 605 in FIG. 6C is a package list for the app B 311 managed by the app management framework 302. The package list 605 includes an import package list 606 and a dynamic import package list 607 pertaining to the app B 311. As illustrated in FIGS. 5A to 5C, the app B 311 declares the "appA.package.public" of the app A 310 in the import package, and thus that information is managed as the import package list 606. The app B 311 does not declare a dynamic import package, and thus the dynamic import package list 607 is empty.

The package list 608 in FIG. 6D is a package list for the app C 312 managed by the app management framework 302 when launching the app. The package list 608 includes an import package list 609 and a dynamic import package list 610 pertaining to the app C 312. As illustrated in FIGS. 5A to 5C, the app C 312 does not declare an import package, and thus the import package list 609 is empty. On the other hand, the app C 312 declares the "appA.package.public" of the app A 310 in the dynamic import package, and thus that information is managed as the dynamic import package list 610. After the app C 312 has been launched, and the app C 312 executes the "appA.package.public" program for the first time, the app management framework 302 carries out a dynamic import for the app C 312.

The package list 611 in FIG. 6E is package information of the app C 312 after the dynamic import has been carried out. When the dynamic import is carried out, the app management framework 302 specifies, from the export package list 601, an app exporting a package in the dynamic import package list 610. The information of the package being dynamically imported, and the information of the app exporting that package, is then added to the import package list 609. After adding the information, the app management framework 302 deletes the information of the package being dynamically imported from the dynamic import package list 610.

Note that the present embodiment describes an example in which the export package list, the package list, the import package list, and the dynamic import package list are generated in memory. However, this information may be generated in a location aside from memory, e.g., in the storage apparatus 202, and managed.

Operation Screen Examples

FIGS. 7A to 7D are diagrams schematically illustrating operation screens corresponding to the user interface unit 201. A main menu, in which icons of the apps that have started to the executed are arranged, is first displayed in the operation screen of the user interface unit 201 when the user uses the image forming apparatus 100. When the user selects an icon displayed in the main menu, the operation screen transitions to an app screen, and the user can execute the functions of the app from that screen. It is assumed here, as an example, that the app A 310 has a document saving function that saves document data in the storage apparatus 202, and is exporting a program for executing that function.

Additionally, it is assumed that the app B 311 has a scan function that scans a document with the scanner unit 204, and the saving function that saves the scanned document in the storage apparatus 202. The app B 311 can furthermore implement the document saving function by executing the program of another app. Here, because the app A 310 is exporting a program for saving a document, the app B 311 imports the program of the app A during the process for launching the app B 311. When the user selects the icon of the app B 311 in the operation screen after the app has been launched, the app B 311 executes the scan function and then executes the document saving function of the app A 310. If the app A 310 is not installed in the image forming apparatus, the program of the app A 310 cannot be imported in the process for launching the app B 311, and thus the app management framework 302 suspends the process for launching the app B 311.

The app C 312 has the scan function that scans a document using the scanner unit 204, as well as a saving destination selection function through which the user can select whether to save the scanned document in the storage apparatus 202 or in an external server (e.g., a storage unit of the information processing apparatus 101). If the user has selected the storage apparatus 202 as the saving destination, the app C 312 can execute the program of the app A 310, in the same manner as the app B 311. However, if the user has selected the external server (e.g., a storage unit of the information processing apparatus 101) as the saving destination, the app C 312 executes its own program to implement the function for saving the document into the external server. Here, like the app B 311, the app C 312 cannot execute the function for saving the document in the storage apparatus 202 if the app A 310 is not installed. Thus unlike the app B 311, the app management framework 302 carries out the import for the app C 312 when the program dynamically imported by the app C 312 is first executed, rather than during the process for launching the app. The developer of the app C develops the app C 312 taking into account a case where the dynamically-imported program is not exported as a condition. It is necessary for the app developer to develop the app C 312 so that the appropriate error handling is carried out for the app C 312 so that the app can run normally even if an attempt is made to execute a program which is dynamically imported but is not being exported. Thus the user can use some of the functions of the app C 312 through the image forming apparatus 100 even if the app A 310 is not installed.

Figure 7A:
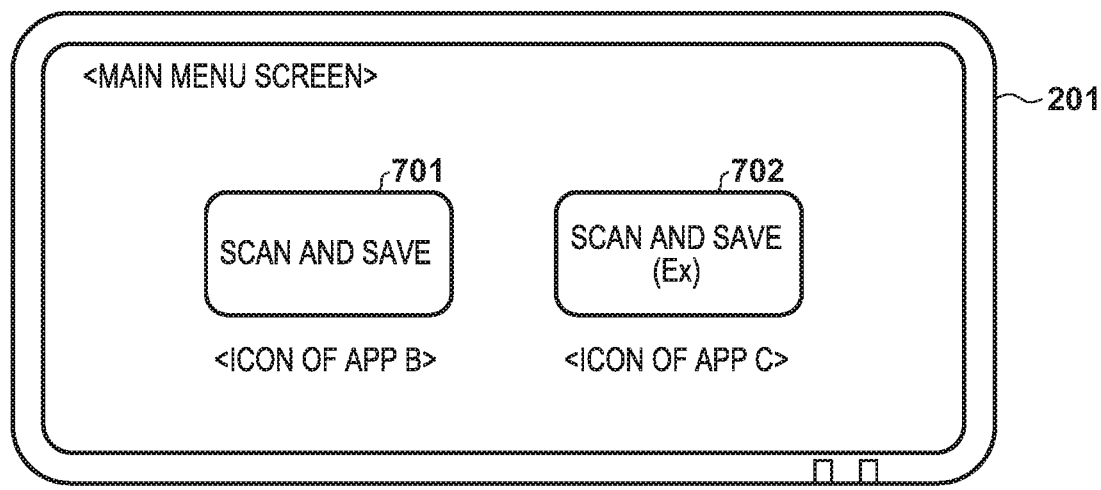
FIGS. 7A to 7D are diagrams schematically illustrating operation screens.

FIG. 7A illustrates the main menu displayed in the operation screen when the app B 311 and the app C 312 have been launched after the app A 310, the app B 311, and the app C 312 have been installed. The app A 310 has been installed but not launched, and thus the icon is not displayed. However, the screen indicates a state where the process for launching the app B 311 and the app C 312 is complete, and thus icons 701 and 702 of the app B 311 and the app C 312, respectively, are displayed in the main menu. The user can use the functions of the app B 311 by selecting the icon 701. Likewise, the user can use the functions of the app C 312 by selecting the icon 702.

Figure 7B:
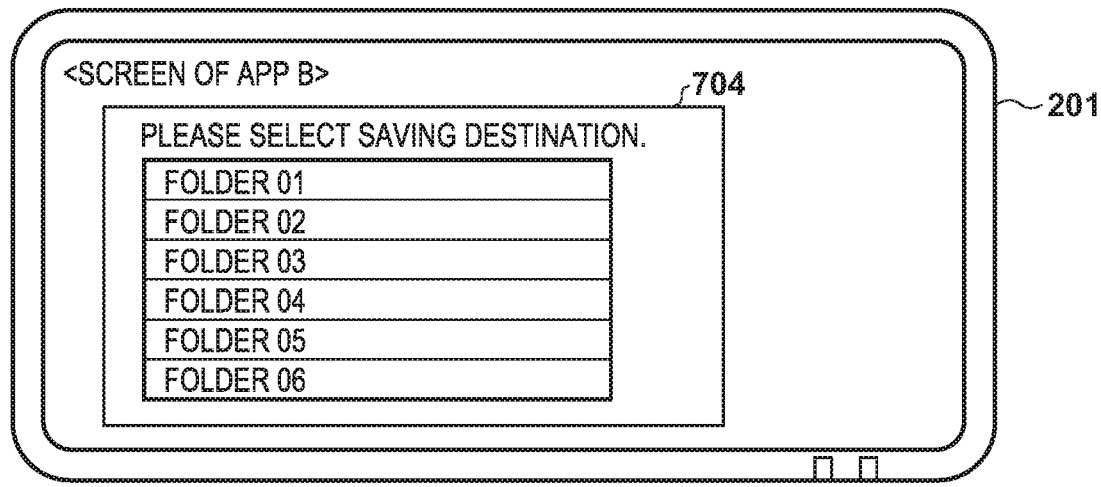

FIG. 7B schematically illustrates a screen for the app B 311 displayed in the operation screen after the user has selected the icon 701 in the state illustrated in FIG. 7A and furthermore used the scan function. The app B implements the document saving function by executing the program of the app A 310. Thus although the screen of the app B 311 is displayed in the operation screen, the app B 311 displays a screen 704 of the app A 310 in the stated screen. When the user operates the screen 704, the app B 311 executes the program of the app A 310 and implements the document saving function.

Figure 7C:
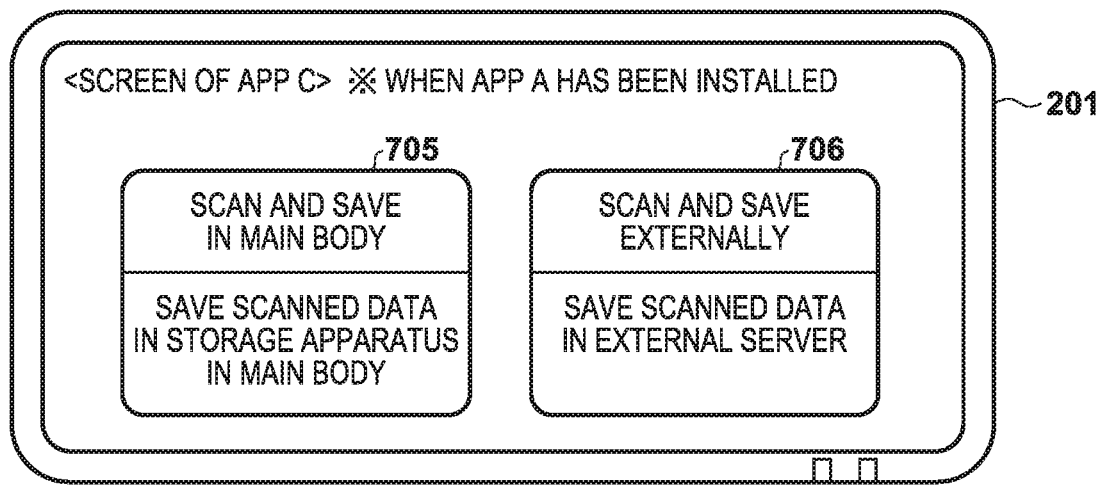

FIG. 7C schematically illustrates a screen for the app C 312 displayed in the operation screen after the user has selected the icon 702 in the state illustrated in FIG. 7A and furthermore used the scan function. A screen that allows the user to select the destination where the scanned document is to be saved is displayed in the screen for the app C 312. An icon 705 is an icon for executing the function for saving the scanned document in the storage apparatus 202 upon that icon being selected. An icon 706 is an icon for executing the function for saving the scanned document in the external server (e.g., the storage unit of the information processing apparatus 101) upon that icon being selected. When the user selects the icon 705, the app C 312 implements the saving function by executing the program of the app A 310. If this is the first time the app C 312 is executing the program of the app A 310, the app C 312 imports the program of the app A 310. The app C 312 then executes the program of the app A 310. When the user selects the icon 706, the app C 312 implements the saving function using only the program of the app C 312 itself.

Figure 7D:
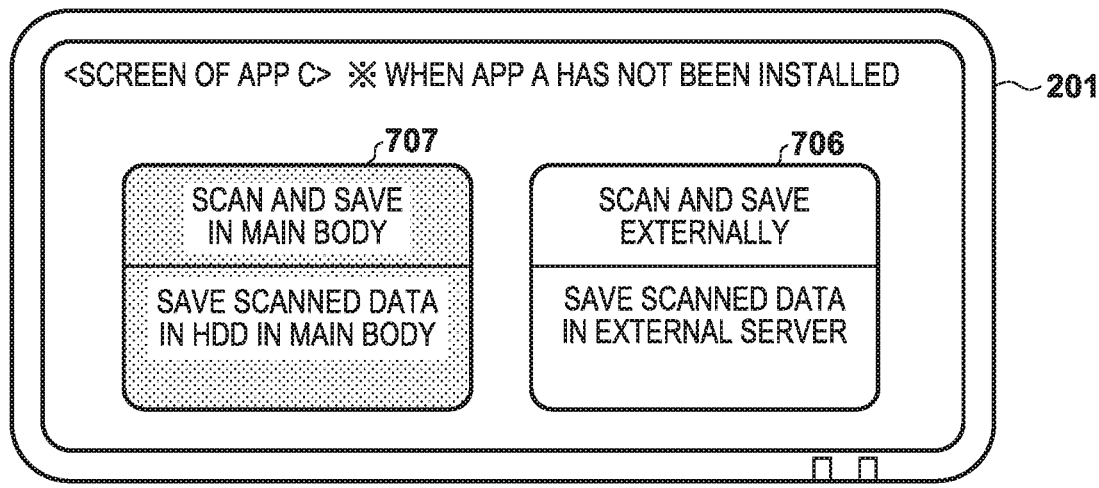

FIG. 7D illustrates a screen of the app C 312 in a state where the app A 310 is not installed in the image forming apparatus 100. Even in a state where the app A 310 is not installed, the app management framework 302 completes the process for launching the app C 312, and thus the icon 702 of the app C 312 is displayed in the main menu of the operation screen. FIG. 7D schematically illustrates a screen for the app C 312 displayed in the operation screen after the user has selected the icon 702 in that state and furthermore used the scan function. Like the icon 705, an icon 707 is an icon for executing the function for saving the scanned document in the storage apparatus 202 upon that icon being selected. However, because the program of the app A 310 cannot be executed, the icon is displayed in a grayed-out manner to indicate that the icon cannot be selected. The app C 312 executes the program dynamically imported when the screen of the selection function is displayed, and then displays the icon 707 after confirming that there is no program that has been exported. Or, the app C 312 may first display the icon 705, and if, after the user has selected the icon 705, there is no program being exported, the icon 707 may then be displayed. Thus by selecting the icon 706, the user can use some of the functions of the app C 312 even if the app A 310 is not installed in the image forming apparatus 100.

Although apps that implement a function for saving a scanned document, handling dynamic import errors through screen transitions and grayed-out displays, and so on are indicated as an example here, it should be noted that apps having other functions, as well as screen transitions and error handling, may be carried out instead.

App Installation Process

FIG. 8 illustrates the flow of processing carried out when the app management framework 302 installs an app. When an instruction to install an app in the image forming apparatus 100 is received from the user administrator through the information processing apparatus 101, the app management framework 302 starts the process for installing the app. When the installation instruction is received from the user, the program files and manifest file of the app are passed to the app management framework 302 through the information processing apparatus 101. In terms of hardware, the processes of FIG. 8 are executed by, for example, the core unit 200 of the image forming apparatus 100, and in particular by a processor of the core unit 200.

In step S801, the app management framework 302 saves the received program files and manifest file into the storage apparatus 202. An example of the method for saving the files into the storage apparatus 202 is as illustrated in FIG. 4.

Then, in step S802, the app management framework 302 generates, in memory, the app class loader for the app to be installed. The package list for the app to be installed is generated at the same time. After step S802, in step S803, the app management framework 302 requests the security module 350 to generate the correct values necessary when verifying whether or not the app to be installed can be trusted (i.e., whether or not the app has been tampered with, damaged, or the like), and then receives the generated correct values. The process moves to step S804 once the correct values have been generated. In step S804, the app management framework 302 obtains the application ID (App-ID) information, the export information, and the dynamic import information from the details written in the manifest file saved in the storage apparatus 202.

Then, in step S805, the app management framework 302 determines whether the information written in the manifest, obtained in step S804, contains information of a program to be dynamically imported. The process moves to step S806 when such information is contained, and to step S807 when such information is not contained.

In step S806, the app management framework 302 adds all the information of the program to be dynamically imported, obtained in step S804, to the dynamic import package list of the app to be installed.

The process then advances to step S807. In step S807, the app management framework 302 determines whether the information written in the manifest, obtained in step S804, contains information of a program to be exported.

The process moves to step S808 when such information is contained, whereas the process for installing the app ends when such information is not contained. In step S808, the app management framework adds the App-ID information obtained in step S804, as well as all of the information of the program to be exported, to the export package list 601. The addition to the export package list ending means that the app to be installed has exported the program. The app management framework 302 then updates the state of the app in the app management file to "installed", and then ends the process for installing the app.

By carrying out the flow illustrated in FIG. 8, not only can the app be installed, but the export package list 601 can also be updated as illustrated in FIGS. 6A to 6E; furthermore, the package list for the app being installed, as well as the dynamic import package list, can be generated as well.

Start of App Execution

Figure 9A:
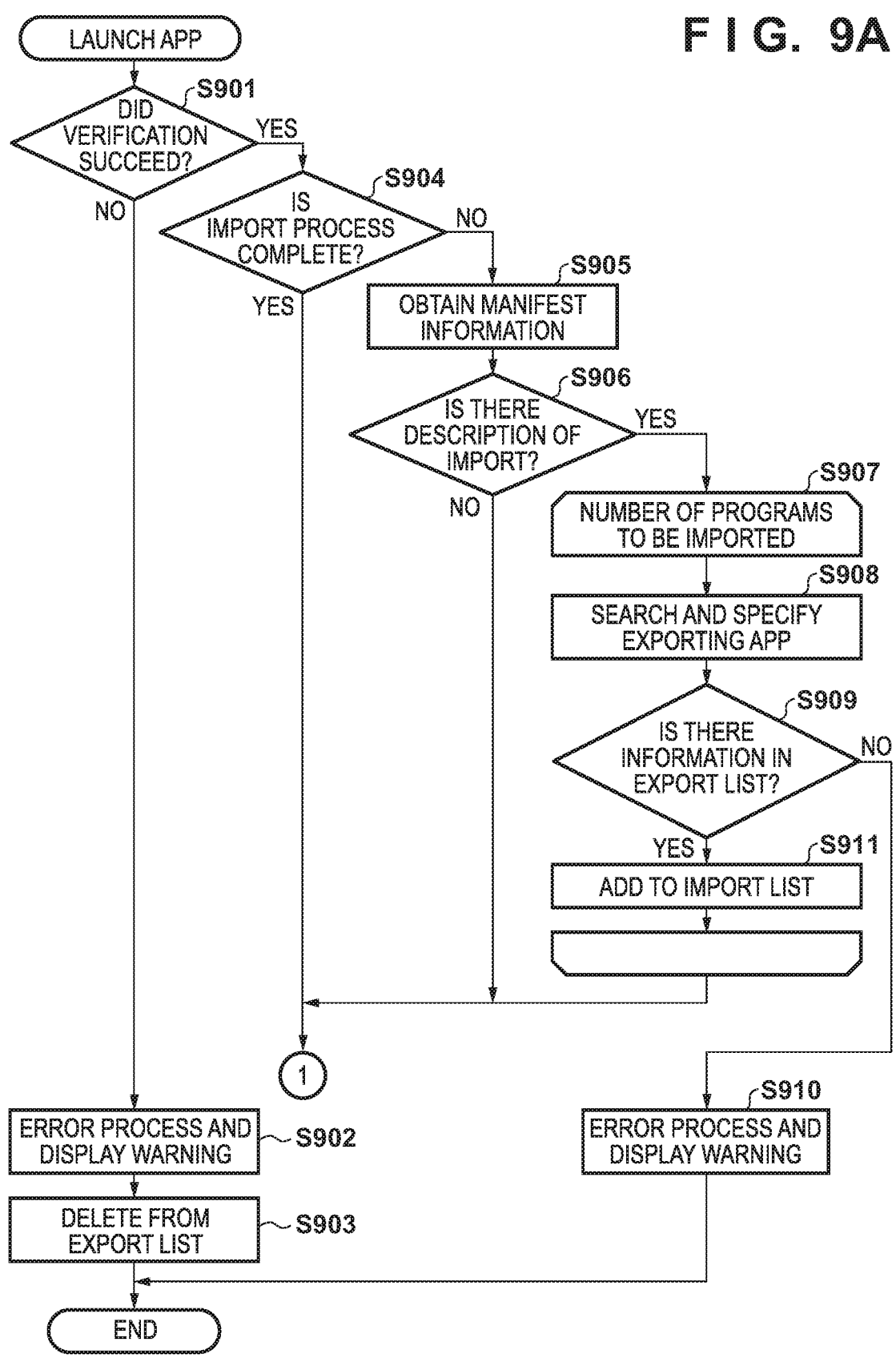
FIGS. 9A and 9B show a flowchart illustrating processing when an app is launched.
Figure 9B:
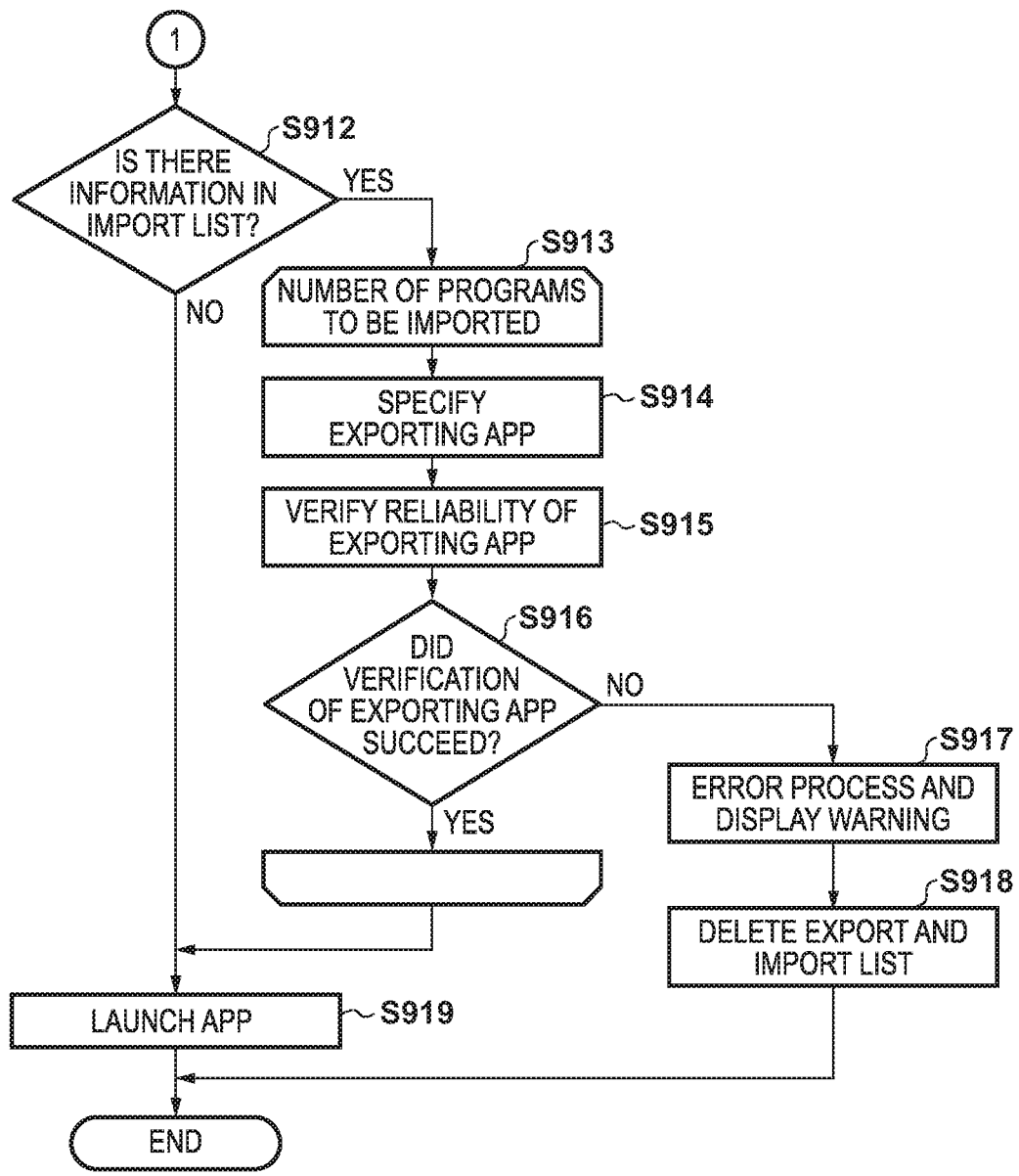

FIGS. 9A and 9B illustrate the flow of processing carried out when the app management framework 302 starts the execution of an app. When an instruction to launch an app in the image forming apparatus 100 is received from the user administrator through the information processing apparatus 101, the app management framework 302 carries out the process for launching the app. The process of FIGS. 9A and 9B are executed within the sequence of FIG. 12, described later, when the image forming apparatus is started up. In terms of hardware, the process of FIGS. 9A and 9B are also executed by, for example, the core unit 200 of the image forming apparatus 100, and in particular by a processor of the core unit 200.

When the process for launching is started, first, in step S901, the app management framework 302 requests the security module 350 to verify whether or not the app to be launched can be trusted. The process moves to step S902 if it has been determined that the app cannot be trusted, and moves to step S904 if it has been determined that the app can be trusted.

In step S902, the app management framework 302 carries out a process for suspending the launching of the app, and provides a warning indicating that the app to be executed cannot be trusted to the user through the user interface unit 201 or the information processing apparatus 101.

Then, in step S903, the app management framework 302 deletes, from the export package list 601, the program being exported by the app determined to be unable to be trusted.

In step S904, the app management framework 302 determines whether the import process is complete. In other words, it is determined whether or not there is an import package list for the app to be launched. If there is no import package list, the import package list for the app to be launched is created, and the process moves to step S905; if the import package list is already present, the process moves to step S912.

In step S905, the app management framework 302 obtains the import information from the details written in the manifest file saved in the storage apparatus 202.

Then, in step S906, the app management framework 302 determines whether the information written in the manifest, obtained in step S905, contains information of a program to be imported. The process moves to step S907 when such information is contained, and to step S912 when such information is not contained.

The iterative process of steps S908 to S910 is carried out the same number of times as there are programs to be imported by the app launched in step S907, in sequence for each program of interest to be imported. Note that these iterations may be suspended when the process has branched from step S909 to step S910 (described later).

In step S908, the app management framework 302 specifies the app exporting the program of interest to be imported. The app management framework 302 checks whether the programs in the import package list are present in the export package list 601 in order, and, when a program has been found, specifies the app by obtaining the App-ID of the program.

If there is no program of interest in the export package list 601 and an app therefore cannot be identified in step S909, the process moves to step S910, whereas if an app that exports a program of interest has been specified successfully, the process moves to step S911.

In step S910, the app management framework 302 carries out a process for suspending the launching of the app, and provides a warning indicating that there is no program to be imported to the user through the user interface unit 201 or the information processing apparatus 101.

In step S911, the app management framework adds information of the program of interest to be imported, and information of the app specified in step S908, to the import package list. The information having been added means that the app to be launched has carried out the import process for the app carrying out the export. If there is an unprocessed program among the programs to be imported, one of those programs is taken as the program of interest, and the processing is repeated from step S908. If there are no unprocessed programs, the process moves to step S912.

In step S912, if the program has been added to the import package list of the app to be launched, the process moves to step S913, whereas if the stated program has not been added, the process moves to step S919.

The iterative process of steps S914 to S916 is carried out the same number of times as there are programs in the import package list of the app being launched in step S913, in sequence for each program of interest to be imported. Note that these iterations may be suspended when the process has branched from step S916 to step S917 (described later).

In step S914, the app management framework 302 specifies the app exporting the program of interest to be imported. Because an app has already been specified in step S908, the app management framework 302 can specify the app by referring to the app information in the import package list.

In step S915, the app management framework 302 requests the security module 350 to verify whether or not the specified app can be trusted.

If, as a result of the verification in step S916, it has been determined that the app cannot be trusted, the process moves to step S917, whereas if it has been determined that the app can be trusted, the process moves to step S914 or step S919. The process moves to step S914 if an app to be processed remains, and to step S919 if no app to be processed remains. If the process has branched to step S917, the loop starting from step S913 may be terminated.

In step S917, the app management framework 302 carries out a process for suspending the launching of the app, and provides a warning to the user through the user interface unit 201 or the information processing apparatus 101.

Then, in step S918, the app management framework 302 deletes, from the export package list 601, the program being exported by the app determined to be unable to be trusted. The app for which the launching has been suspended is then deleted from the import package list, and the process for launching the app ends.

Step S919 is executed when there is no program to be imported or when the programs to be imported have all been successfully verified. In step S919, the app management framework 302 displays the icon of the app to be launched in the operation screen corresponding to the user interface unit 201, updates the state of the app to "launched" in the app management file, and ends the process for launching the app.

By carrying out the process indicated by the flow in FIGS. 9A and 9B, the system can verify an app when the app is launched. Furthermore, in step S915, a list (import list) of other apps that may be executed by the app being launched (apps being imported) is created on the basis of the import information of the app, and those other apps can therefore be verified as well. If there is an app that cannot be trusted, the system can carry out error handling as appropriate. For example, if, when the system receives an instruction to launch the app B 311, a program of the app A 310 has been tampered with by an attacker, the system can determine that the app B is an app that cannot be trusted through the processes of steps S915 and S916. The app management framework 302 can then suspend the process for launching the app A so as not to allow the app B to execute the program of the app A.

App Execution

Figure 10:
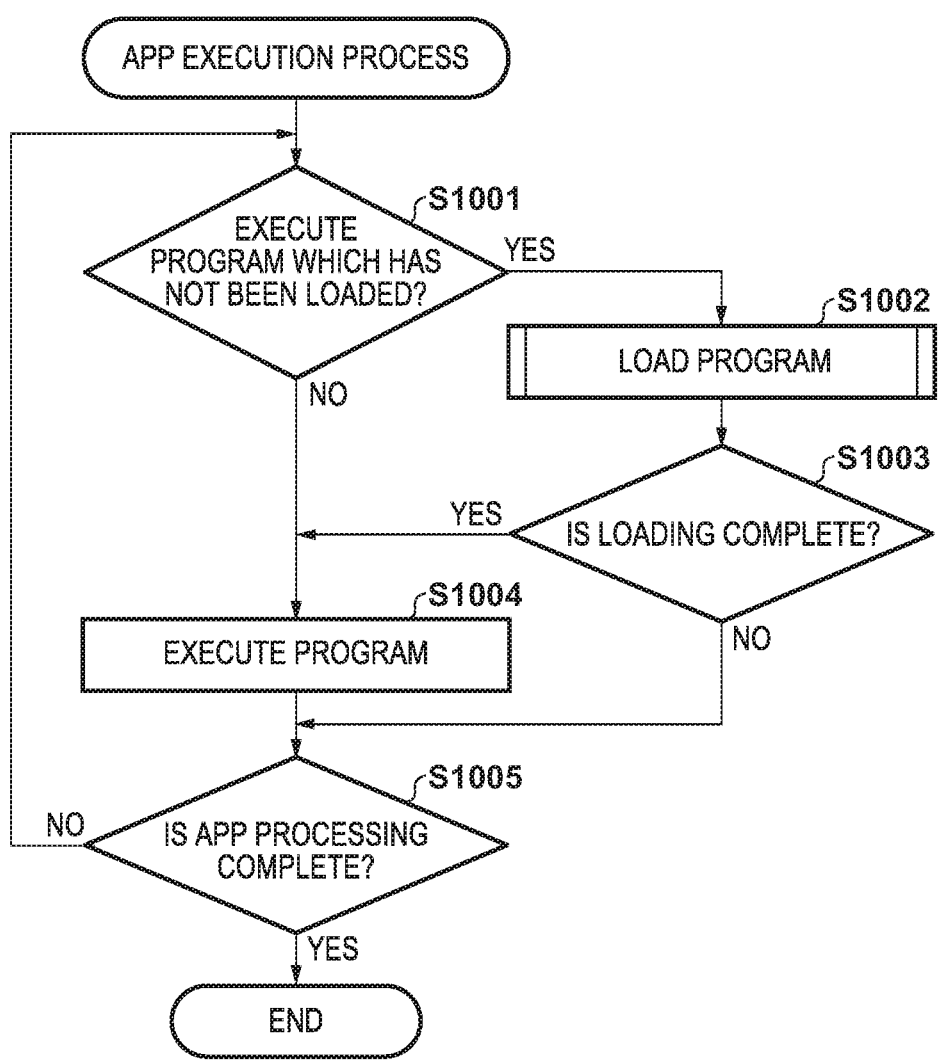
FIG. 10 is a flowchart illustrating processing when an app is executed.
Figure 11A:
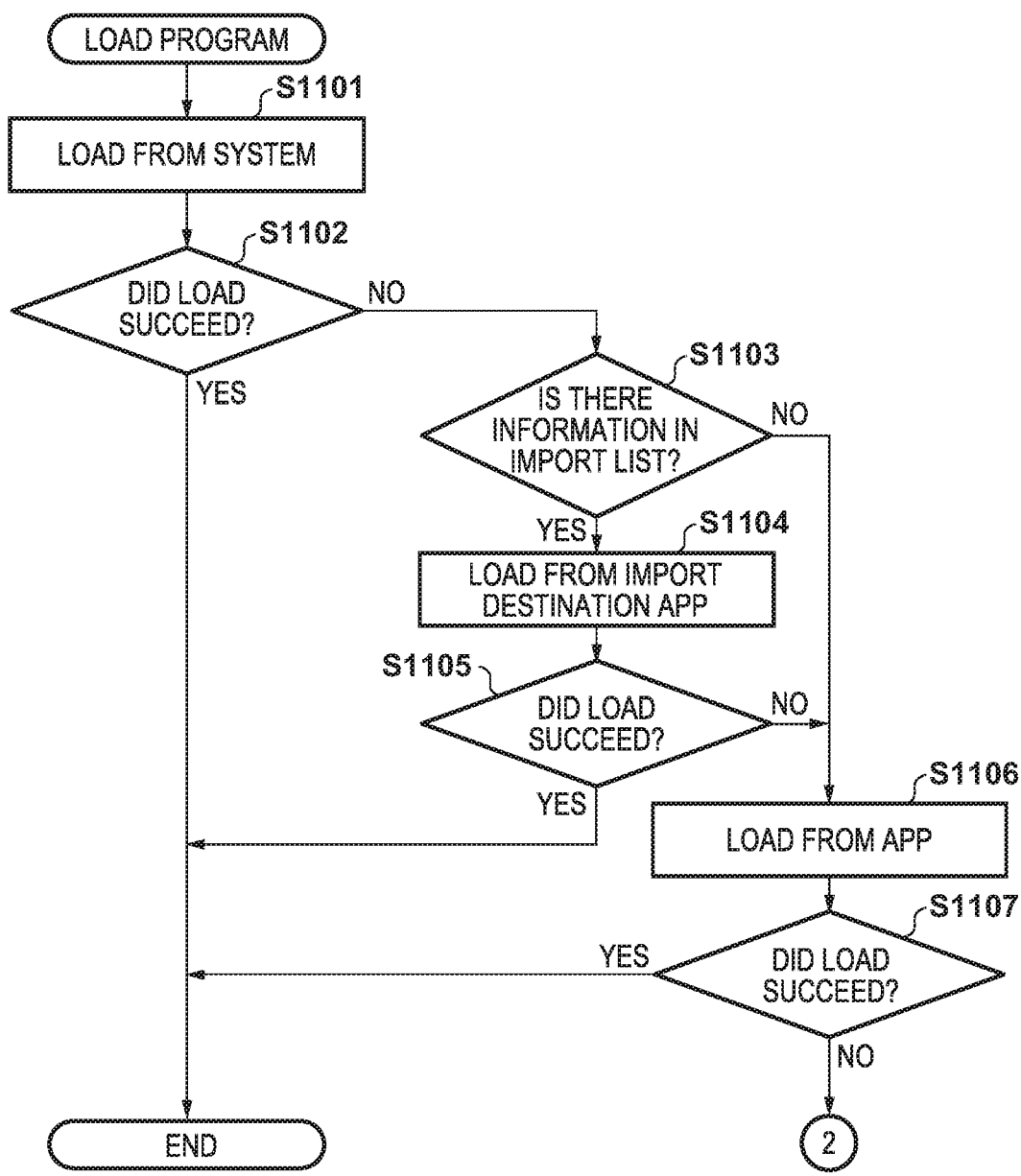
FIGS. 11A and 11B show a flowchart illustrating processing when an app is executed.
Figure 11B:
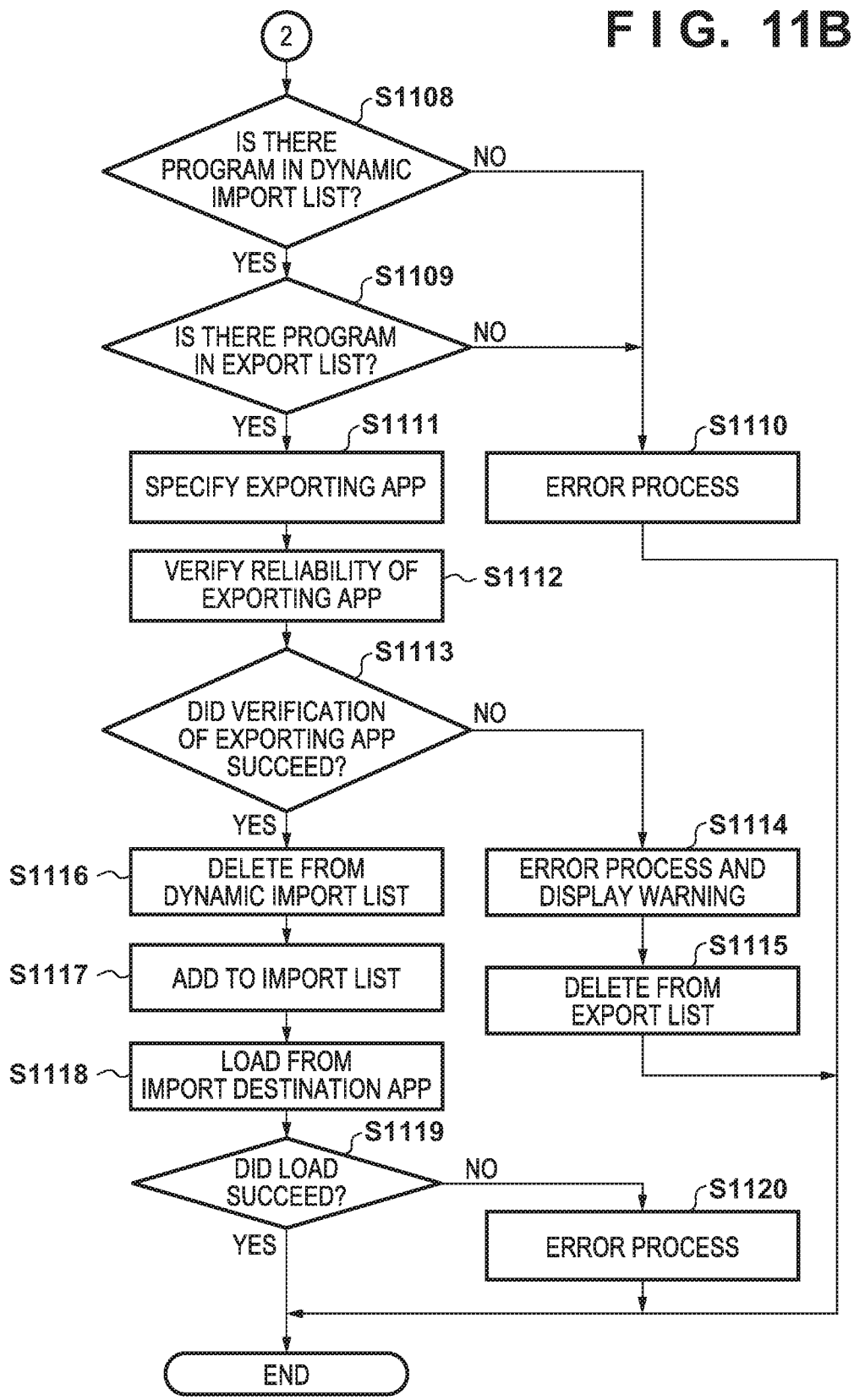

FIGS. 10, 11A and 11B illustrate the flow of processing carried out when the user has instructed an app to be executed after the app management framework 302 has completed the process for launching the app. An app is executed by an engine module (not shown) that executes the program code of the app. The engine module is executed, in terms of hardware, by the core unit 200 of the image forming apparatus 100, and in particular by a processor of the core unit 200. In this example, the engine module is a Java virtual machine (JVM) included in the Java execution environment 301, and apps, the support library 340, and the like are executed by the engine module. Note that when an app is written in native code that can be executed by the core unit 200, the core unit 200 may execute that app directly. In terms of software, the entities executing the processes of FIGS. 10 and 11 are the JVM in the Java execution environment 301, the system-class loader 3010, the app class loader, and so on, and these may be switched through, for example, an API or the like. This will not be described in any particular detail below.

The process of FIG. 10 is started by the Java execution environment 301 upon the user instructing the app to be executed. First, the app class loader of that app determines whether or not the program has been loaded into memory (step S1001). The process moves from step S1001 to step S1002 if the executed program has not yet been loaded in memory, and moves to step S1003 if the program is already loaded. In step S1002, the app class loader of the app to be loaded loads the program. The flow of this process is illustrated in FIGS. 11A and 11B. Note that at this time, step S1002 may be executed having specified the program to be loaded as an argument.

In step S1003, it is determined whether the class loading is complete, with the process moving to step S1004 if the loading is complete, and to step S1005 if the class loading has failed. In step S1004, the engine module executes the program loaded into the memory. Note that the processing from step S1001 to step S1004 is not limited to the apps 311 and 312, and the same processing may be carried out for system programs as well. This corresponds to a case where, for example, a system program called from an app and executed furthermore executes another system program. In step S1005, if the app processing is not yet complete, the process moves to step S1001, whereas if the processing is complete, the flow of FIG. 10 ends. The app processing not yet being complete corresponds to, for example, a case where the app is executed one step at a time in step S1004, and the determination is made each time a step is complete. If the app is not executed one step at a time in step S1004, the determination of step S1005 is first made when an attempt is made to execute the unloaded program. As will be described with reference to FIGS. 11A and 11B, in step S1002, the program is loaded in accordance with the type of the program, i.e., a system program, an unloaded program of the app being executed, an imported program, a dynamically imported program, and so on. By repeating that loop, the programs to be loaded are loaded dynamically with each repetition.

FIGS. 11A and 11B illustrate the flow of processing through which the app class loader loads an unloaded program in step S1002 of FIG. 10. In step S1101, the app class loader first requests the system-class loader 3010 to load an unloaded program. If a system program is included in the unloaded programs, the system-class loader 3010 loads the corresponding system program.

In step S1102, the system-class loader 3010 determines whether the program has been successfully loaded. If not, the process moves to step S1103. If so, the process ends, and then returns to step S1003. However, if the system program is already loaded, it is determined that the system program could not be loaded, and the process branches to step S1103.

In step S1103, the app class loader of the app to be executed determines whether there is information of the unloaded program and the app to export that program in the import package list of the app to which the app class loader itself corresponds. The process moves to step S1104 if it is determined in step S1103 that such information is present, and to step S1106 if it is determined that such information is not present. In step S1104, the app class loader requests another app class loader, corresponding to an app present in the import package list (this is, in other words, also an app that is carrying out an export), to load the program.

In step S1105, the app class loader carrying out the export determines whether the exported app has been successfully loaded. If the load has been successful, the process for loading the program ends. However, if the load has failed, the process moves to step S1106. If the program to be imported is already loaded, it is determined that the program could not be loaded, and the process branches to step S1106.

In step S1106, the app class loader attempts to load the unloaded program from the programs of the app corresponding to that app class loader itself.

In step S1107, it is determined whether the program has been successfully loaded. If the app had an unloaded program, the program is successfully loaded, and the process for loading the program ends. If the loading of the program has failed, the process moves to step S1108. If the program of the app is already loaded, too, it is determined that the program could not be loaded, and the process branches to step S1108.

In step S1108, the app class loader determines whether there is information of the unloaded program in the dynamic import package list of the app to which the app class loader itself corresponds. The process moves to step S1109 if such information is present, and to step S1110 if such information is not present.

In step S1109, the app class loader determines whether an unloaded program to be dynamically imported is present in the export package list 601. The process moves to step S1111 if such a program is present, and to step S1110 if such a program is not present.

In step S1110, an error is output for a situation where the unloaded program could not be loaded, and an error is returned to the app or system that attempted to execute the unloaded program. The process branches to step S1110 in three cases, namely when the loading has failed in step S1106, when there is no program to be imported in step S1108, and when the program to be imported has not been exported in step S1109. Of these, the branching from step S1108 may not be an error, and thus the process may end normally. For the other cases, the reason for the error in each case may be output.

In step S1111, the app class loader specifies the app exporting the unloaded program from the export package list 601.

Then, in step S1112, the security module 350 is requested to verify whether or not the app carrying out the export, specified in step S1111, can be trusted.

If in step S1113 the app carrying out the export has been successfully verified and is therefore an app that can be trusted, the process moves to step S1116, whereas if the verification fails and the app therefore cannot be trusted, the process moves to step S1114.

In step S1114, the app class loader suspends the process for loading the unloaded program, and provides a warning indicating that the program to be dynamically imported has been tampered with or is damaged to the user through the user interface unit 201 or the information processing apparatus 101.

Then, in step S1115, the app class loader deletes, from the export package list 601, the program being exported by the app determined to be unable to be trusted. The process of FIGS. 11A and 11B then ends without the app class loader loading the unloaded program.

If the verification of step S1113 has succeeded, in step S1116, the app class loader deletes, from the dynamic import package list of the app to which the app class loader itself corresponds, the information of the program that was being loaded.

Then, in step S1117, the app class loader adds the deleted program information to the import package list of the app to which the app class loader itself corresponds. This addition being complete means that the exported program of the app has been dynamically imported.

In step S1118, the app class loader requests another app class loader corresponding to the app specified in step S1111 to load the program.

In step S1119, it is determined whether the program has been successfully loaded. If the program of the app carrying out the export has been successfully loaded, the process for loading the program ends. However, if the load has failed, the process moves to step S1120.

In step S1120, an error is output for a situation where the unloaded program could not be loaded, and an error is returned to the app or system that attempted to execute the unloaded program.

By carrying out the processing flow illustrated in FIGS. 10, 11A and 11B the app class loader can load an unloaded program being dynamically imported, and the program can be executed by an app for the system. For example, consider a situation where a program of the app A 310 has been attacked by an attacker. In this case, when the app C 312 first executes the program of the app A 310 that is being dynamically imported, the system determines, through the processes of steps S1112 and S1113, that the app A 310 is an app that cannot be trusted. The loading of the program of the app A 310 can then be suspended to prevent the app C 312 from executing the program of the app A 310.

Here, in FIG. 10, the programs are loaded by repeatedly executing step S1002 for all of the programs to be loaded, which is carried out through the loop that returns to step S1001 from step S1005. Thus by repeating the loop, the app class loader loads the programs in order from system programs, to programs being imported, to programs of the app itself that is executing the program, and to programs to be dynamically imported, through step S1002, or in other words, through FIGS. 11A and 11B. However, a different order from the order illustrated here may be used. For example, the process for loading may be carried out with the program of the app itself having the highest priority, moving on to system programs, programs being imported, and programs to be dynamically imported if the loading of the program of the app itself fails.

Additionally, in the example illustrated in FIGS. 10, 11A and 11B, when an app is launched, whether or not the app being launched and an app exporting the program imported by the app being launched can be trusted is verified; however, the trust verification may be carried out at the time when each class loader carries out its loading in FIGS. 11A and 11B. With the configuration according to the present embodiment, system programs are loaded by the system-class loader 3010, whereas app programs are loaded by the corresponding app class loader. Even with such a configuration, carrying out the processing flow illustrated in FIGS. 10, 11A and 11B makes it possible to verify whether or not a program that another class loader is attempting to load can be trusted, even if the modules for loading are different.

Sequence for Launching Apps by Image Forming Apparatus

Figure 12:
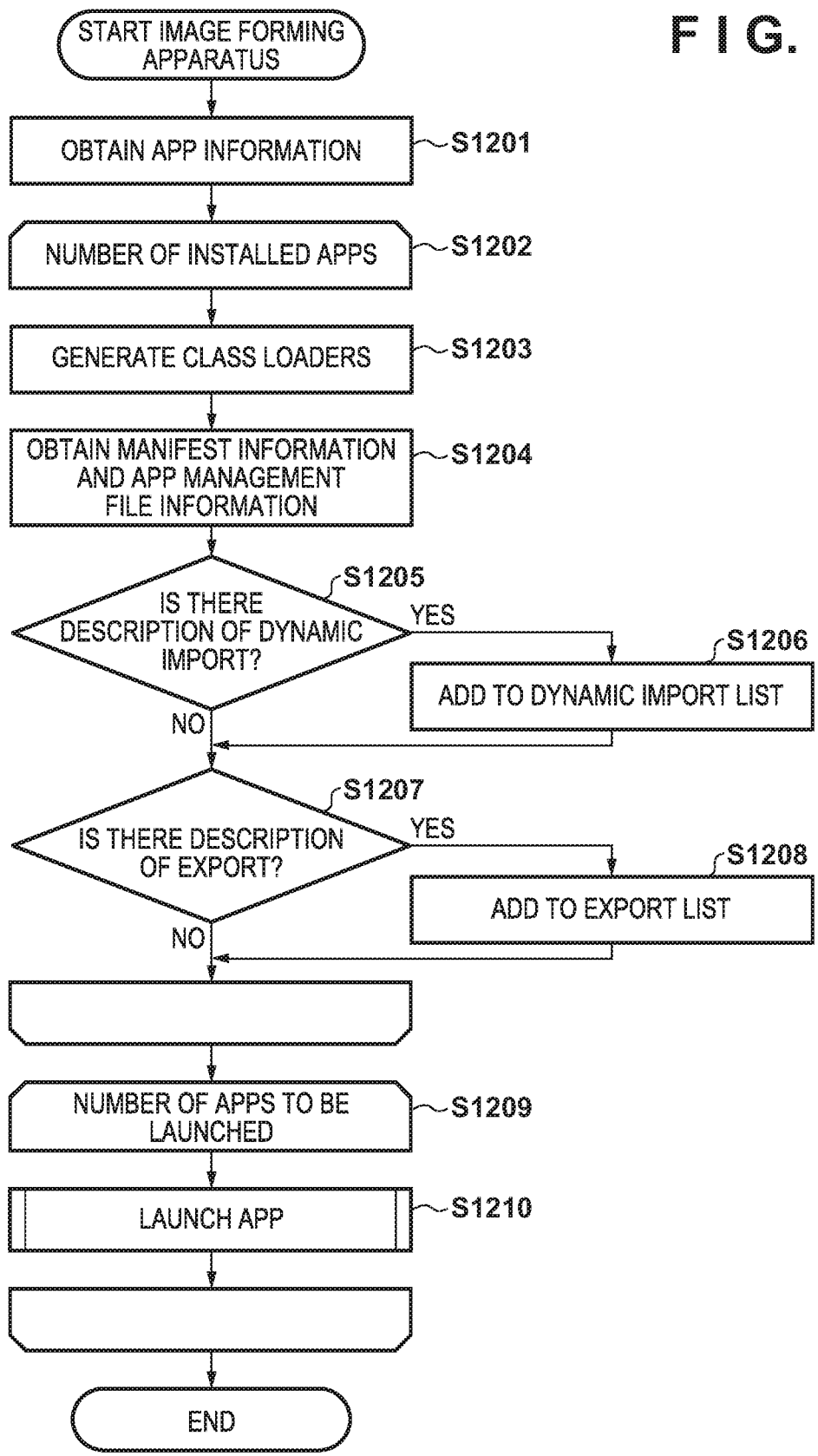
FIG. 12 is a flowchart illustrating processing when an image forming apparatus is started up.

FIG. 12 illustrates the flow of processing carried out by the app management framework 302 when starting up the image forming apparatus 100. When the user turns the power to the image forming apparatus 100 on, the Java execution environment 301 calls a process for launching the app management framework 302, and the app management framework 302 then carries out the process of step S1201.

In step S1201, the app management framework 302 examines the applications installed in the image forming apparatus 100. The app management framework 302 determines that the apps in the storage apparatus 202 are apps that are installed, and obtains information regarding which apps are installed on the basis of the result of that determination. Note that if an app is registered in a database (e.g., a depository) through which the operating system manages resources, the apps that are installed can be known by referring to that database.

In step S1202, the app management framework 302 carries out the iterative processing of steps S1203 to S1208 pertaining to the installed apps, the same number of times as there are apps installed in the image forming apparatus 100.

In step S1203, the app management framework 302 generates the app class loaders corresponding to the installed apps. At the same time, the export package list 601 and the package list corresponding to each of the installed apps (see FIG. 6B) are generated as well. Unlike when installing an app, the correct values, which are necessary when verifying whether or not an app can be trusted, are not generated here. The state of the app when the app was installed is saved as the correct value, and that correct value continues to be used thereafter.

After step S1203, in step S1204, the app management framework 302 obtains the App-ID information, the export information, and the dynamic import information from the details written in the manifest file of each app in the storage apparatus 202. Furthermore, the app management framework 302 obtains the state of each app from the app management file of that app.

Then, in step S1205, the app management framework 302 determines whether the information written in the manifest, obtained in step S1204, contains information of a program to be dynamically imported. The process moves to step S1206 when such information is contained, and to step S1207 when such information is not contained.

In step S1206, the app management framework 302 adds all the information of the program to be dynamically imported, obtained in step S1204, to the dynamic import package list of the app to be installed. The process then advances to step S1207. In step S1207, the app management framework 302 determines whether the information written in the manifest, obtained in step S1204, contains information of a program to be exported. The process moves to step S1208 when such information is contained, and to step S1209 when such information is not contained.

In step S1208, the app management framework adds the App-ID information obtained in step S1204, as well as all of the information of the program to be exported, to the export package list 601. The addition to the export package list ending means that the app to be installed has exported the program.

The processing then advances to S1209. In step S1209, the app management framework 302 carries out the iterative process of step S1210 the same number of times as there are apps that have been launched, on the basis of the app states obtained in step S1204. In step S1210, the app management framework carries out the process for launching the app, illustrated in FIGS. 9A and 9B. The import package list is generated having verified the program being exported in the sequence illustrated in FIGS. 9A and 9B. Note that the app being launched may be an app specified by the user through the user interface.

By carrying out the processing flow illustrated in FIG. 12, even if there is system information that is lost when the power to the image forming apparatus 100 is turned off, the image forming apparatus can, when the power is turned on again, run the same system and apps as before the power was turned off. For example, each app class loader is generated in the memory before the power is turned off, and thus when the power is turned on again, the information in the memory is cleared and all of the app class loaders are lost. Accordingly, by carrying out the process of step S1203, the app class loaders corresponding to the apps can be generated again. Likewise, even if the export package list 601, as well as the package lists and the dynamic import package lists of the apps, have been lost in response to the power being turned off, the lists can be generated again by carrying out the processes of steps S1203, S1206, and S1208. Note that even if the import package list has been lost in response to the power being turned off, the list can be generated again in step S905, within step S1210. Through these processes, even if the power to the image forming apparatus 100 is turned off and then turned on again, the system can once again generate the app class loaders, the lists, and so on, and thus the system, apps, and so on can run in the same manner as before the power was turned off.

Effects of Embodiment

According to the embodiment of the present invention described above, when an app is launched, it is verified whether or not the app to be executed, as well as an app exporting a program to be imported by the stated app, can be trusted. Furthermore, when carrying out a dynamic import, it is verified whether or not the app exporting the program to be dynamically imported can be trusted while the app is being executed. Accordingly, even with a configuration in which a first app that exports a program and a second app that imports or dynamically imports the program of the first app are installed, and even with a configuration that involves no security risk, e.g., a configuration where the second app executes the program of the first app, the system can verify whether or not the first app can be trusted when the second app is launched. Alternatively, when the second app dynamically imports the program of the first app, the system can verify whether or not the first app can be trusted. As a result of verifying whether or not the app can be trusted, for example, the process of launching the second app can be caused to fail, and error handling can then be carried out, so as to prevent the program of the first app, which cannot be trusted, from being executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-061358, filed Mar. 27, 2019 which is hereby incorporated by reference herein in its entirety.

What is claimed is:

1. An information processing apparatus in which a plurality of applications operate, the apparatus comprising:
at least one memory storing instructions; and
at least one processor that, upon executing the stored instructions, causes the information processing apparatus to function as:
a reception unit that receives an instruction to launch an application and an instruction to execute the application;
a verification unit that verifies whether or not an application can be trusted; and
a controller that controls the application according to a result of verification by the verification unit,
wherein, after the reception unit has received an instruction to launch a first application,
the verification unit verifies the first application and a second application, the second application indicated to be imported to the first application, and
the controller launches the first application in a case where the verification of the first application and the verification of the second application are successful,
the controller does not launch the first application in a case where the verification of the first application fails, and
the controller does not launch the first application in a case where the verification of the second application fails, and
wherein, after the reception unit has received an instruction to execute the first application,
the verification unit verifies a third application indicated to be imported to the first application upon execution of the first application, and
the controller imports the third application and executes the first application in a case where the verification of the third application is successful, and
the controller executes the first application without importing the third application in a case where the verification of the third application fails.

2. The information processing apparatus according to claim 1, wherein the verification unit verifies that the first application, the second application, and the third application have not changed since the first application and the second application were installed.

3. The information processing apparatus according to claim 1,
wherein when an application is installed and when the information processing apparatus is started up, it is determined whether the application will dynamically import another application, and if the application will dynamically import another application, a first list including the application to be dynamically imported is generated; and
the controller causes the verification unit to verify the second application on the basis of the first list.

4. The information processing apparatus according to claim 3,
wherein when the application is installed and when the information processing apparatus is started up, an application to be exported to another application is specified, and if the application will be exported, a second list including the application to be exported is generated; and
the controller causes the verification unit to verify the second application when the second application is included in both the first list and the second list.

5. The information processing apparatus according to claim 1,
wherein when the verification of the second application by the verification unit has failed, the controller outputs information indicating that the verification has failed, and stops the execution of the first application.

6. The information processing apparatus according to claim 5, further comprising:
a user interface unit,
wherein the controller displays the information indicating that the verification of the second application has failed in the user interface unit.

7. The information processing apparatus according to claim 1, further comprising:
a scanner that scans an image; and
a printer that prints an image,
wherein the application uses a function of one of the scanner and the printer.

8. A non-transitory computer medium in which is stored a program for causing a computer, in which a plurality of applications operate, upon execution of the program to function as a reception unit that receives an instruction to launch an application and an instruction to execute the application, a verification unit that verifies whether or not an application can be trusted and a controller that controls the application according to a result of verification by the verification unit,
wherein, after the reception unit has received an instruction to launch a first application,
the verification unit verifies the first application and a second application, the second application indicated to be imported to the first application, and
the controller launches the first application in a case where the verification of the first application and the verification of the second application are successful,
the controller does not launch the first application in a case where the verification of the first application fails, and
the controller does not launch the first application in a case where the verification of the second application fails, and
wherein, after the reception unit has received an instruction to execute the first application,
the verification unit verifies a third application indicated to be imported to the first application upon execution of the first application, and the controller imports the third application and executes the first application in a case where the verification of the third application is successful, and the controller executes the first application without importing the third application in a case where the verification of the third application fails.

9. A control method for an information processing apparatus in which a plurality of applications operate, wherein the information processing apparatus includes at least one memory storing instructions and at least one processor that, upon executing the stored instructions, causes the information processing apparatus to function as a reception unit that receives an instruction to launch an application and an instruction to execute the application, a verification unit that verifies whether or not an application can be trusted and a controller that controls the application according to a result of verification by the verification unit; and wherein, after the reception unit has received an instruction to launch a first application, the verification unit verifies the first application and a second application, the second application indicated to be imported to the first application, and the controller launches the first application in a case where the verification of the first application and the verification of the second application are successful, the controller does not launch the first application in a case where the verification of the first application fails, and the controller does not launch the first application in a case where the verification of the second application fails, and wherein, after the reception unit has received an instruction to execute the first application, the verification unit verifies a third application indicated to be imported to the first application upon execution of the first application, and the controller imports the third application and executes the first application in a case where the verification of the third application is successful, and the controller executes the first application without importing the third application in a case where the verification of the third application fails.

* * * * *